US006960270B2

United States Patent
Matsumoto et al.

(10) Patent No.: US 6,960,270 B2
(45) Date of Patent: Nov. 1, 2005

(54) OPTICAL DISK PRODUCING DEVICE AND PRODUCING METHOD

(75) Inventors: Yutaka Matsumoto, Saitama (JP); Hironobu Nishimura, Saitama (JP); Masahiko Kotoyori, Tokyo (JP); Koji Yamaguchi, Yokohama (JP); Yoshihiko Naito, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 172 days.

(21) Appl. No.: 10/258,288

(22) PCT Filed: Feb. 8, 2002

(86) PCT No.: PCT/JP02/01079

§ 371 (c)(1),
(2), (4) Date: Oct. 23, 2002

(87) PCT Pub. No.: WO02/065463

PCT Pub. Date: Aug. 22, 2002

(65) Prior Publication Data

US 2003/0104097 A1 Jun. 5, 2003

(30) Foreign Application Priority Data

Feb. 16, 2001 (JP) .................................... 2001-039873

(51) Int. Cl.⁷ ............................................. G11B 7/26
(52) U.S. Cl. .................. 156/74; 156/245; 156/275.5; 156/275.7; 156/379.8; 156/500; 156/556
(58) Field of Search ................................ 156/245, 500, 156/74, 275.5, 275.7, 379.8, 556; 428/64.2, 64.4, 65.2; 369/286

(56) References Cited

U.S. PATENT DOCUMENTS

| 6,103,039 | A | * | 8/2000 | Paulus et al. ............... 156/223 |
| 2003/0066594 | A1 | * | 4/2003 | Malakouti et al. ...... 156/244.11 |
| 2003/0231576 | A1 | * | 12/2003 | Usami ......................... 369/272 |

FOREIGN PATENT DOCUMENTS

| JP | 2-301080 | 12/1990 |
| JP | 3017492 | 8/1995 |
| JP | 9-265671 | 10/1997 |
| JP | 10-312588 | 11/1998 |
| JP | 2000-113529 A | 4/2000 |
| JP | 2000-113529 | 4/2000 |
| JP | 2001-143330 | 5/2001 |
| JP | 2001-189037 | 7/2001 |
| JP | 2002-92967 | 3/2002 |

OTHER PUBLICATIONS

English Translation of JP 03017492.*

* cited by examiner

Primary Examiner—Blaine Copenheaver
Assistant Examiner—Barbara J Musser
(74) Attorney, Agent, or Firm—McDermott Will & Emery LLP

(57) ABSTRACT

A molding machine 1 which molds two sheets of disc substrates on which the information is recorded simultaneously, a cooling mechanism 3 for cooling each of the disc substrates, first movably mounting means 2 for movably mounting the disc substrate from the molding machine onto the cooling mechanism, and a second movably mounting means 4 for mounting each of the disc substrates onto a receiving portion of the turn table 5 are provided. In addition, a film forming device 8 for receiving sequentially each of the disc substrates from this movably mounting means 6 and forming a reflective film on one of the surfaces of each of the received disc substrates on which the information is recorded; a turn table 10 having a plurality of receiving portions on which the disc substrates are mounted and which rotates intermittently through each constant angle; a reversing mechanism 11 which reverses 180 degrees each of the disc substrates; and an overlapping mechanism for overlapping the reversed disc substrates over the other disc substrates are provided. Furthermore, spinners 15, 16 for rotating the overlapped two sheets of disc substrates and a curing device 23 which radiates ultra-violet rays onto the disc substrates which are rotated by the spinners to cure the liquid adhesive. According to the above-described structure, an optical disc which is compact, is fast in a production speed, and has a high quality can be achieved.

19 Claims, 11 Drawing Sheets

Fig.2
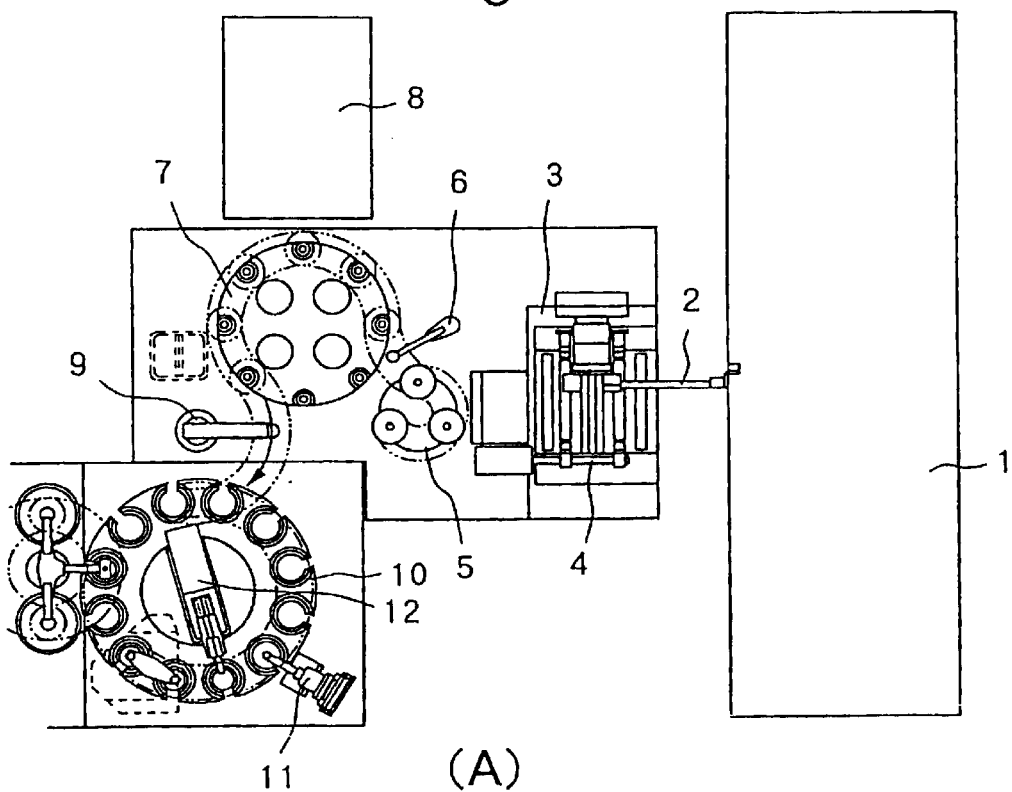
(A)
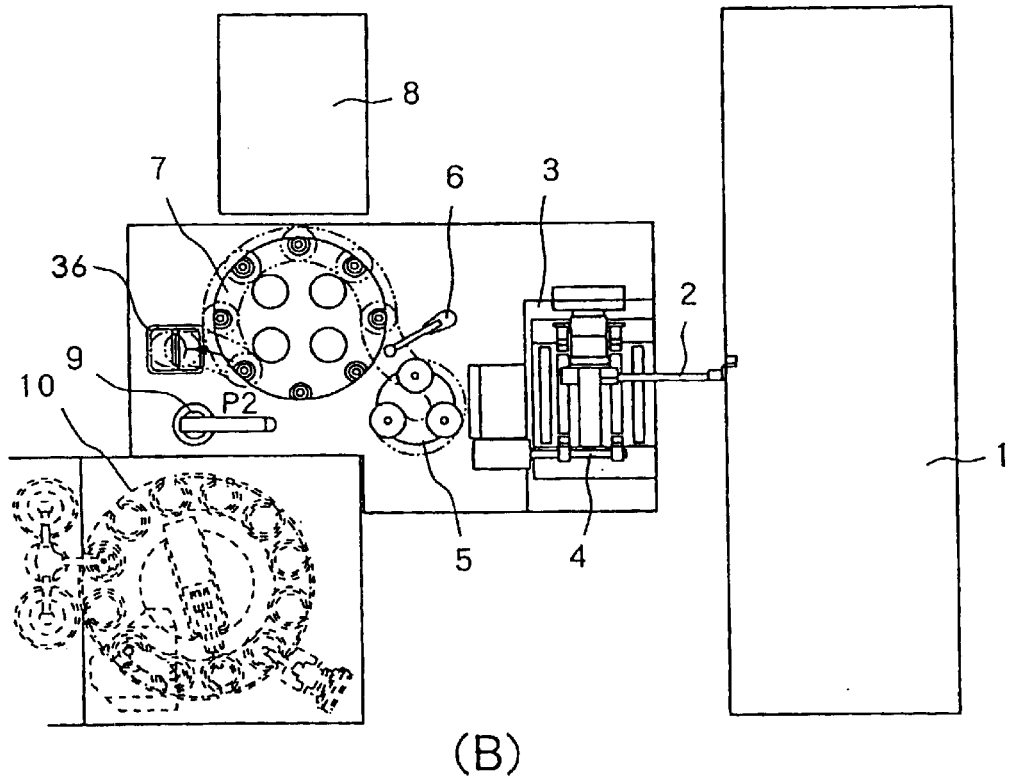
(B)

Fig. 11
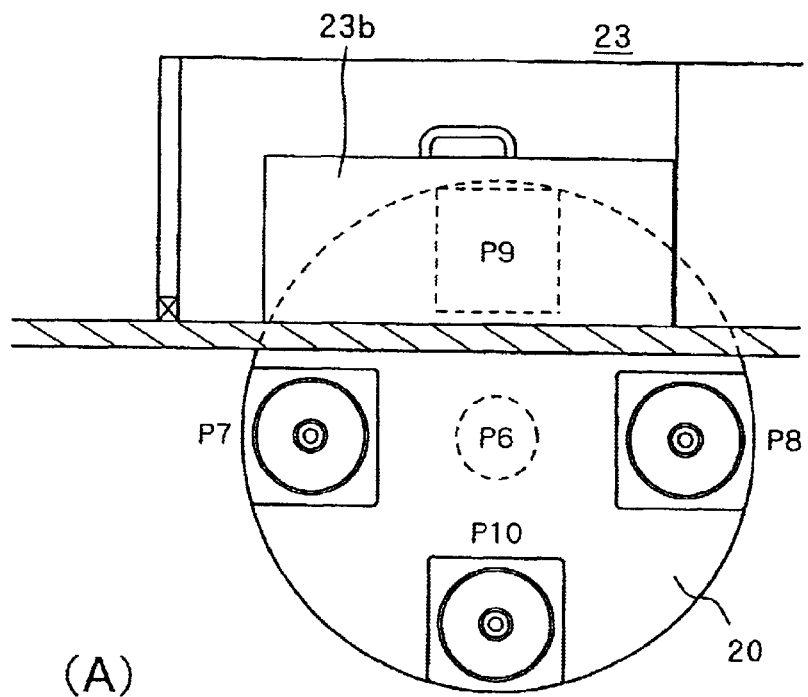
(A)
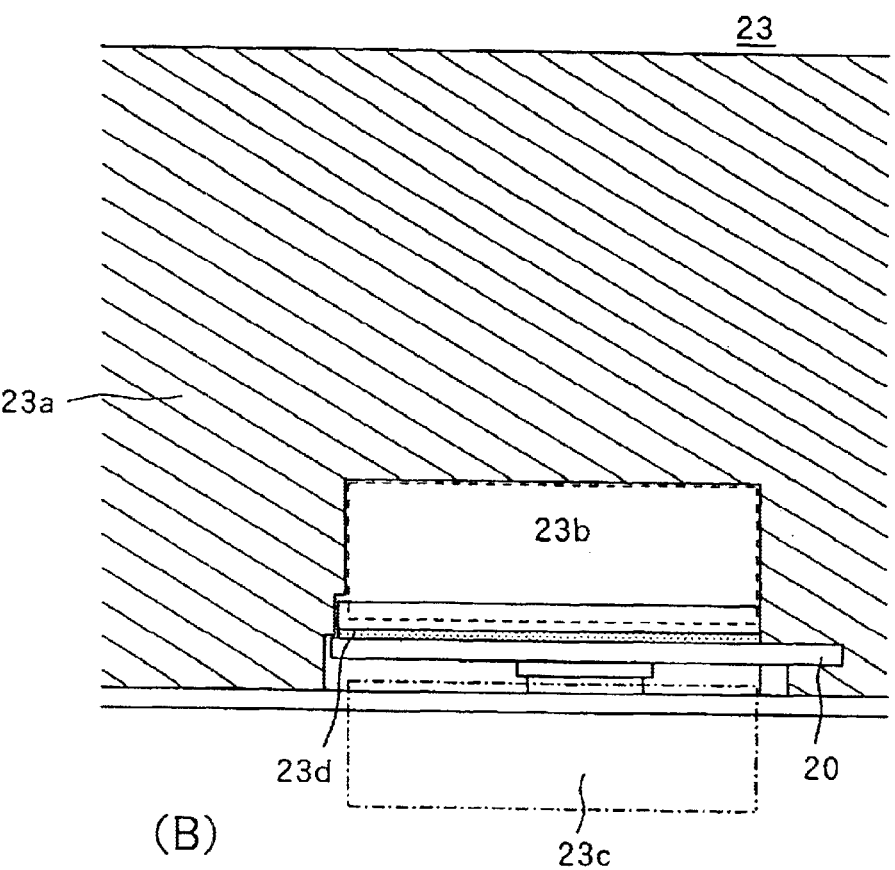
(B)

OPTICAL DISK PRODUCING DEVICE AND PRODUCING METHOD

TECHNICAL FIELD

The present invention relates to techniques of manufacturing an optical disc which is capable of reading optically a recorded information and of adhering two sheets of optical disc substrates.

BACKGROUND ART

A technology of increasing a record capacity through an optical disc has been developed and has widely been spread. Furthermore, the recording capacity of the optical disc is tended to be more highly dense. For example, an optical disc having a recording capacity of 8.5 gigabytes called DVD-9 and recorded from both surfaces for each layer in a double layer structure has been produced. A manufacturing method of such a kind of optical disc as described above is such that two sheets of disc substrates are formed on which mutually different information is recorded by means of two molding machines and reflective films having different reflectivities are formed on their corresponding recording surfaces by means of two sputtering devices and disc substrates are adhered together with mutual recording surfaces faced with each other. The reflective films have two alternative cases of using two different kinds of reflective materials for the reflective film to achieve different reflectivities and of varying a thickness of the same material reflective film to achieve different reflectivities.

On the other hand, there is another optical disc on one surface of which a one layer is recorded and having the recording capacity of 4.7 gigabytes. In this case, one disc substrate on which an information is already recorded and another disc substrate on which an information is recorded are formed by means of two molding machines and, thereafter, the reflective film is formed only on the recording surface by means of a single sputtering device. Then, there are two cases in which no reflective film is formed on the disc substrate having no recording surface and in which another sputtering device is used to form the reflective film whose reflectivity is different from that of the one optical disc substrate on which the recording surface is provided. These two disc substrates are adhered together. In such an optical disc as a Digital Versatile Disc (DVD) or Compact Disc (CD), the disc substrates are manufactured by e. g., molding machines. However, a considerable heat is used to soften a resin material during the molding. A temperature of the disc substrate outputted from the molding machine is high. Hence, the reflective film needs to be formed by means of a sputtering device after the temperature is reduced to a normal temperature. This cooling is carried out at a process at which the disc substrates from both molding machines are disposed in a plane form on respective receipt tables of carrying mechanism generally straightly moved and a cooling wind is blown over the disc substrates. Consequently, this mechanism becomes large sized and there is a possibility of adhering a dust on an upper surface of the disc substrates. In addition, two film forming devices such as sputtering devices are prepared at a process in which two sheets of disc substrates from the step at which different reflective films are formed and two sheets of disc substrates on which the reflective films whose reflectivities are different from each other by means of their corresponding film forming devices are carried to a transfer device and the two sheets of disc substrates are overlapped on the transfer device and overlap device. However, since a distance by which the two sheets of optical disc substrates are moved becomes long and there is a high possibility of adhering a dust on the upper surfaces of the disc substrates. In addition, an occupied area of the dust cannot be small but also requires the time in carrying the disc substrates. It is noted that since an accurate read of the information cannot be achieved when a dust or the like is adhered on the adhering surface of each disc substrate, the adhering of the dust on the adhering surface of each disc substrate needs to be avoided. Although this problem can be solved if the manufacture is carried out in a clean room, it is practically difficult to carry out the manufacture in the clean room with a cost and other production line taken into consideration. In either case, in a conventional manufacturing device, the carrying mechanism itself, transfer mechanism itself, and a combination of these mechanisms has different points even if the molding machine in which the single machine simultaneously manufactures two kinds of disc substrates and film forming device such as a sputtering device in which the single machine can form two kinds of reflective films is used or not used. A carrying line from the molding process of disc substrates to an overlapping process is so long that it takes a lot of time. Hence, there is a high possibility of adhering a dust onto the disc substrates. In addition, the carrying line cannot be small sized.

DISCLOSURE OF THE INVENTION

It is, hence, an object of the present invention to provide optical disc manufacturing apparatus and method which can reduce the size and shorten a manufacturing line length so that a time required for manufacturing the optical disc is shortened to reduce a possibility of dust or dirt being inserted into a manufacturing process with a movably mounting operation and a carrying operation of the manufacturing line for the optical disc changed as many as possible to a combination of a turning operation and a rotating operation.

To achieve the above-described object, according to the present invention defined in claim 1, there is provided an optical disc manufacturing apparatus for manufacturing an optical disc constituted by two sheets of mutually adhered disc substrates, the optical disc manufacturing apparatus comprising: a molding machine which molds each of the disc substrates on which an information is recorded; a cooling unit to cool a corresponding one of the disc substrates; first movably mounting means for moving the one disc substrate from the molding machine to the cooling unit and mounting the one disc substrate onto the cooling unit; second movably mounting means for moving the one disc substrate from the cooling unit to a receiving portion of first carrying means; a film forming device which receives sequentially the one disc substrate from the first carrying means and forms a reflective film on a surface of the one disc substrate on which the information is recorded; second carrying means having a plurality of receiving portions on one of which the one disc substrate is mounted for rotating intermittently through each constant angle; reversing means for reversing front and rear surfaces of the one disc substrate; an overlap mechanism which overlaps the reversed one disc substrate on the other disc substrate to which a liquid adhesive is supplied; a spinner which spins the overlapped two sheets of disc substrates; and a curing device which radiates ultra-violet rays on the spun disc substrates to cure the adhesive. According to the optical disc manufacturing apparatus, DVDs having high qualities can be produced at high speed through a process and the apparatus itself is compact.

That is to say, according to the present invention defined in claim 2, there is provided an optical disc manufacturing apparatus for manufacturing an optical disc constituted by two sheets of mutually adhered disc substrates as claimed in claim 1, wherein the molding machine is capable of molding one sheet of the disc substrate or molding simultaneously two sheets of the disc substrates.

According to the invention defined in claim 3, there is provided an optical disc manufacturing apparatus for manufacturing an optical disc constituted by two sheets of mutually adhered disc substrates as claimed in either claim 1 or 2, wherein the first movably mounting means is capable of movably mounting one sheet of the disc substrate or simultaneously two sheets of the disc substrates.

According to the invention defined in claim 4, there is provided an optical disc manufacturing apparatus for manufacturing an optical disc constituted by two sheets of mutually adhered disc substrates as claimed in either claim 1 or 2, wherein the cooling unit carries out a heat radiation by receiving one sheet of the disc substrate or simultaneously two sheets of the disc substrates and by providing a spatial interval between the vertically standing disc substrates in a form of a single column of file or of double columns of files.

According to the invention defined in claim 5, there is provided an optical disc manufacturing apparatus for manufacturing an optical disc constituted by two sheets of mutually adhered disc substrates, the optical disc manufacturing apparatus comprising: a cooling unit to radiate a heat of a disc substrate molded by the molding machine, the cooling unit including three or more feed shafts, each feed shaft having a groove formed spirally at the same pitch and being disposed so as to be placed on a part of a phantom outer periphery of the disc substrate, the outer periphery part of the disc substrate being housed in the groove, and each feed shaft being rotated at the same speed so that all disc substrates supported on the respective feed shafts are forward fed.

According to the present invention described in claim 5, a distance for which the disc substrate whose temperature is high is received to carry out a cooling, in other words, a length of the cooling mechanism is short and compact as compared with a conventional art and the structure suitable for assuring simultaneous receipt and delivery of the two sheets of disc substrates can be achieved.

According to the invention defined in claim 6, there is provided an optical disc manufacturing apparatus for manufacturing an optical disc constituted by two sheets of mutually adhered disc substrates, the optical disc manufacturing apparatus comprising: a cooling unit to radiate a heat of the disc substrate which is formed by a molding machine; and movably mounting means for movably mounting the disc substrate which is cooled by the cooling unit onto carrying means and wherein the movably mounting means adsorbs and holds the disc substrate from the cooling unit, turns in a vertical direction, and, thereafter, rotates through substantially a right angle so that the disc substrate is positioned in a flat plane state and is mounted on a receiving portion of the carrying means. According to the present invention defined in claim 6, the direction of the disc substrate on the cooling mechanism can be changed and mounted on turn table. The structure suitable for assuring the delivery of the two sheets of disc substrates at the same time can be achieved.

According to the invention defined in claim 7, there is provided an optical disc manufacturing apparatus for manufacturing an optical disc constituted by two sheets of mutually adhered disc substrates, the optical disc manufacturing apparatus comprising: a molding machine for molding each of the disc substrates on which an information is recorded; a cooling unit to cool a corresponding one of the disc substrates; a film forming device which forms a reflective film on a surface of each of the disc substrates on which the information is recorded; and an adhering mechanism including: a spinner which spins the overlapped two sheets of disc substrates via a liquid adhesive; and a curing device which cures the liquid adhesive between the two sheets of disc substrates and wherein the discharge chute and movably mounting means are interposed between the film forming device and adhering mechanism, when a trouble occurs at an output side at a manufacturing process including and after the adhering mechanism, the mechanisms including and after the adhering mechanism are stopped, the mechanisms from the molding machine to the film forming device are continued to be operated, and, at the same time, the movably mounting means is operated to discharge the disc substrate outputted from the film forming device to the discharge chute. According to the invention described in claim 7, for the trouble including and after the adhering mechanism, since the film forming device is operated from molding machine, the molding quality of the disc substrate can be maintained, suppressing the number of exhaust chutes to be installed to a minimum number.

According to the invention defined in claim 8, there is provided an optical disc manufacturing apparatus for manufacturing an optical disc constituted by two sheets of mutually adhered disc substrates as claimed in claim 7, wherein the discharge chute is divided into two parts to which the movably mounting means distributes alternately the disc substrates outputted from the film forming device according to a difference in the reflective film formed on the disc substrates or according to a presence or absence of the reflective film.

According to the invention defined in claim 9, there is provided an optical disc manufacturing apparatus for manufacturing an optical disc constituted by two sheets of mutually adhered disc substrates, the optical disc manufacturing apparatus comprising: carrying means, having a plurality of receiving portions on which the disc substrates are mounted, for rotating intermittently through each constant angle, the receiving portion comprising: a turn table which is cut off in a vicinity to an outer peripheral portion of the carrying means and which is arranged in such a manner that the receiving portions receives alternately one of the disc substrates on each surface of which a reflective film is formed or any other of the disc substrates on either surface of which the reflective film is formed with both of the substrates as a pair; reversing means for reversing one of the pair of disc substrates utilizing the cut off portion of the turn table; an adhesive supplying nozzle which supplies a liquid adhesive onto one of the pair of disc substrates; an overlapping mechanism which overlaps the pair of the disc substrates; a spinner which spins the overlapped disc substrates; and a curing device which cures the liquid adhesive. According to the invention described in claim 9, a compact adhering mechanism can adhere two sheets of disc substrates with a high quality.

According to the invention defined in claim 10, there is provided an optical disc manufacturing apparatus for manufacturing an optical disc constituted by two sheets of mutually adhered disc substrates as claimed in claim 9, wherein the overlapping mechanism turns each of the reversed disc substrates in a horizontal direction with the reversed disc substrate attracted and held thereby, moves the reversed disc substrate just above the disc substrate to which the liquid adhesive is supplied and overlap these disc substrates on each other.

According to the invention defined in claim 11, there is provided an optical disc manufacturing apparatus for manufacturing an optical disc constituted by two sheets of mutually adhered disc substrates as claimed in either claim 9 or 10, wherein the overlapping mechanism comprises: first elevating means for rising from a lower portion of the turn table, for receiving the reversed disc substrates from the turn table, and for raising the reversed disc substrates in a vertical upward direction; moving means for absorbing and holding the reversed disc substrates and turning in the horizontal direction and for moving the reversed disc substrates just above one of the disc substrates to which the liquid adhesive is supplied and which is mounted on an adjacent receiving portion; and second elevating means for rising from a lower direction of the turn table, for raising one of the disc substrates to which the liquid adhesive is supplied, for overlapping the raised disc substrate onto the disc substrate held by the moving means, for supporting the overlapped two sheets of the disc substrates and lowering to return the supported overlapped two sheets of the disc substrates to the turn table.

According to the invention defined in claim 12, there is provided optical disc manufacturing apparatus for manufacturing an optical disc constituted by two sheets of mutually adhered disc substrates as any one of the preceding claims 9 through 11, wherein the optical disc manufacturing apparatus comprises carrying means for receiving sequentially the adhered two sheets of disc substrates from the spinner, the carrying means having a turn table arranged in such a manner that a part of the adhered two sheets of disc substrates is passed through a projection portion enclosed by a projection wall portion projected from a device wall toward an outer direction and the curing device is placed at the projection portion and radiates ultra-violet rays onto the two sheets of disc substrates when the turn table passes through the projection portion. According to the invention, an ill influence of the heat development of curing device given to the other mechanisms and processes can be suppressed to a minimum.

According to the invention defined in claim 13, there is provided an optical disc manufacturing method, comprising: a molding step for molding each of disc substrates; a cooling step for picking out one of the disc substrates from a molding machine, arranging each of the disc substrates so as to stand vertically at spaces, cooling each of the vertically stand disc substrates, and forward feeding each of the disc substrates; a movably mounting step for turning each of the disc substrates which is forward fed and reaches to a predetermined position in a vertical direction and, thereafter, for revolving each of the disc substrates through substantially a right angle and mounting each of the disc substrates which is revolved onto a plane; a film forming step for forming a reflective film on each of the disc substrates; and an adhering step including: an overlapping step for overlapping two sheets of disc substrates via a liquid adhesive; a revolving step for revolving the overlapped two sheets of disc substrates; and a curing step for curing the liquid adhesive. According to the invention described in claim 13, such a method that each of the disc substrates on the cooling mechanism can be mounted on the turn table with the direction of each disc substrate changed and a simultaneous assured delivery of two sheets of disc substrates can be achieved.

According to the invention defined in claim 14, there is provided an optical disc manufacturing method, comprising: a molding step for molding each of disc substrates; a film forming step for forming a reflective film on each of the disc substrates; and an adhering step including: an overlapping step for overlapping two sheets of disc substrates via a liquid adhesive; a revolving step for revolving the overlapped two sheets of disc substrates; and a curing step for curing the liquid adhesive, and wherein an abnormality occurs at the steps including and after the overlapping step, the steps from the molding step to the film forming step are continued without change and each of the disc substrates on which the reflective film is formed is sequentially discharged without passing the steps after the film forming step. According to the invention described in claim 14, since the disc substrate molding step to the film forming step are operated without change for the trouble including and after the adhering step, the number of discharge processes can be suppressed to a minimum and a molding quality of the disc substrate can be maintained.

According to the invention defined in claim 15, there is provided an optical disc manufacturing method as claimed in claim 14, wherein each of the disc substrates is divided and discharged according to a kind of the reflective film or according to a presence or absence of the reflective film.

According to the invention defined in claim 16, there is provided an optical disc manufacturing method for manufacturing an optical disc constituted by two sheets of mutually adhered disc substrates, comprising: a film forming step for forming reflective films sequentially or alternately on the sequentially supplied disc substrates; a reversing step for reversing one of a pair of the disc substrates; a step for supplying the liquid adhesive on an upper surface of each of the disc substrates which is not reversed at the reversing step or a lower surface of each of the disc substrates which is reversed at the reversing step; an overlapping step for carrying the reversed disc substrate right above the disc substrate not reversed right below the reversed disc substrate and for overlapping the reversed and non-reversed disc substrate on each other; a step for spinning the overlapped two sheets of disc substrates; and a step for curing the liquid adhesive between the two sheets of disc substrates. According to the invention described in claim 16, the adhering of the two sheets of disc substrates can be achieved with high quality by means of the compact adhering mechanism.

BRIEF DESCRIPTION OF THE DRAWINGS

FIGS. 2(A) and 2(B) are explanatory views for explaining an operation of an optical disc manufacturing apparatus according to the present invention when a failure in the apparatus occurs.

FIGS. (a) through (h) of 7 are explanatory views for explaining an overlapping step and its previous step of each of the disc substrates in the optical disc manufacturing apparatus according to the present invention.

Figure 8:
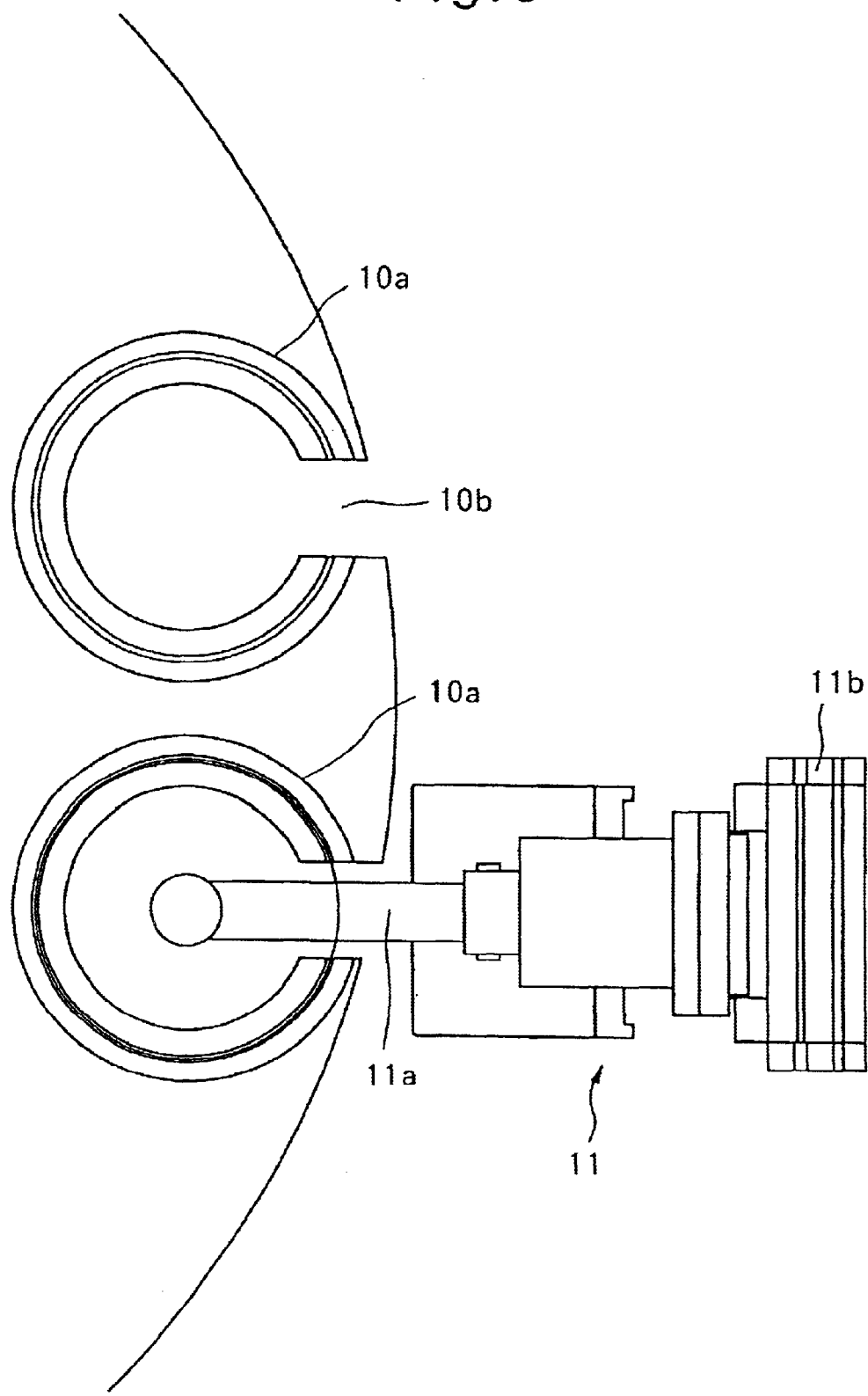

FIG. 8 is an explanatory view for explaining a reversing mechanism of each of the disc substrates in the optical disc manufacturing apparatus according to the present invention.

FIGS. (A) through (F) of 9 are explanatory views for explaining an example of the reversing mechanism of the disc substrates in the optical disc manufacturing apparatus according to the present invention.

Figure 10:
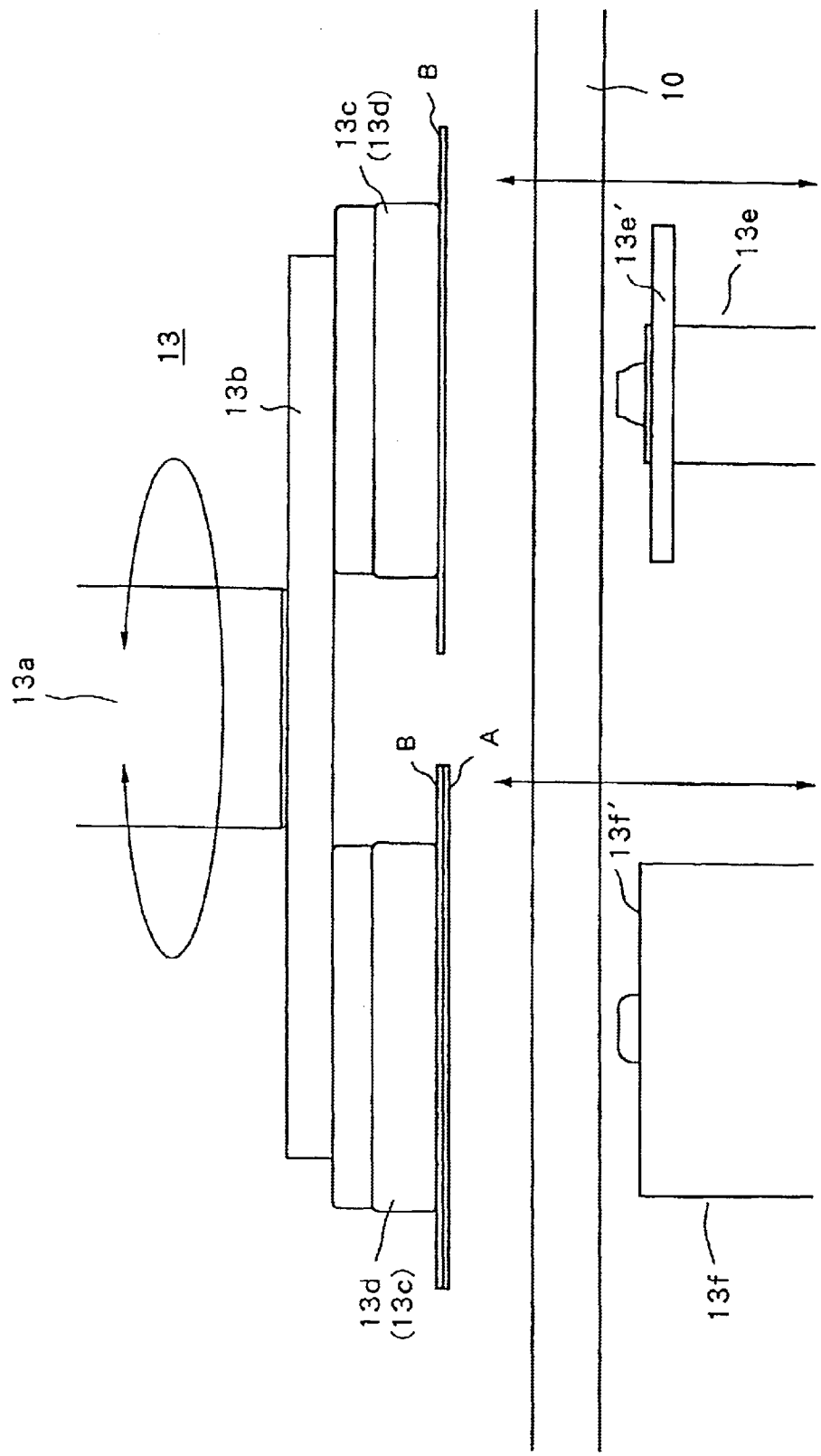

FIG. 10 is an explanatory view for explaining an overlapping mechanism of overlapping two sheets of disc substrates in the optical disc manufacturing apparatus according to the present invention.

FIGS. 11(A) and 11(B) are explanatory views for explaining a curing device in the optical disc manufacturing apparatus according to the present invention.

BEST MODE FOR CARRYING OUT THE INVENTION

First, a preferred embodiment of an optical disc manufacturing apparatus according to the present invention which corresponds to that of an optical disc manufacturing method according to the present invention will be described with reference to FIG. 1 which shows a rough configuration of the optical disc manufacturing apparatus.

Figure 1:
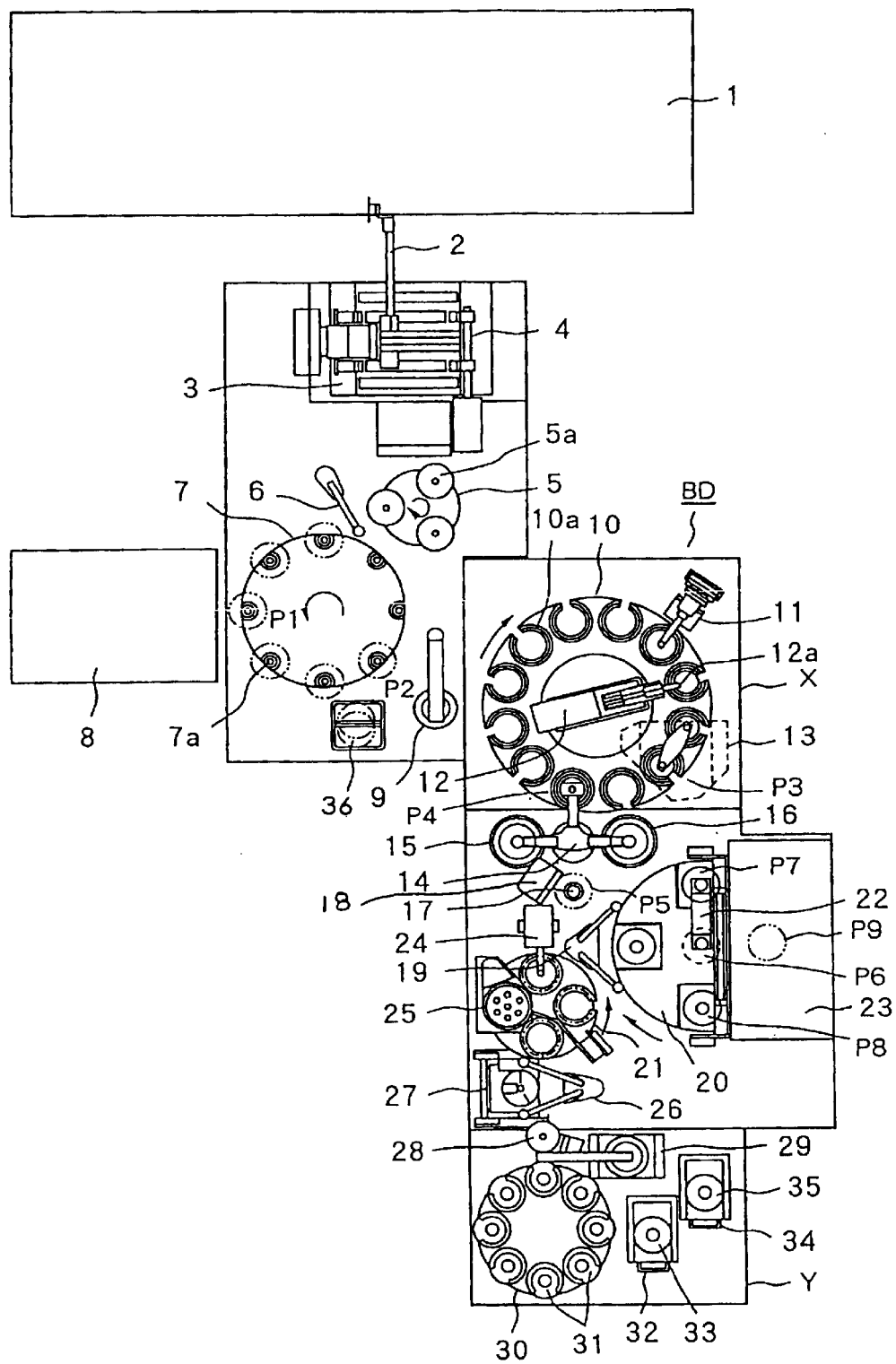
FIG. 1 is a preferred embodiment of an integrated manufacturing line of an optical disc according to the present invention.

In FIG. 1, reference numeral 1 denotes a molding machine which can simultaneously mold two sheets of disc substrates on each of respective surfaces of which a different information is recorded.

A transfer mechanism 2 serving as movably mounting means includes a movably mounting arm and its drive unit. Movably mounting means 2 absorbs, holds, and receives simultaneously two sheets of disc substrates carried from molding machine 1, turns in a substantially vertical direction, and mounts them onto a cooling mechanism 3 which will be described in details later.

Cooling mechanism 3 is used to cool each of the disc substrates which has finished the molding to a vicinity to a normal temperature since a temperature of each of the disc substrates which has finished the molding is high.

The disc substrates which are aligned to stand vertically at constant spatial intervals are carried in a forward direction and reach to a predetermined position. At this time, two sheets of disc substrates are simultaneously mounted on two receiving portions 5a of a turn table 5 which is first rotary type carrying means by means of second transfer mechanism 4 serving as a second movably mounting means. The detailed description of second movably mounting means 4 will be described later.

Second transfer mechanism 4 serving as a second movably mounting means simultaneously absorbs and holds the two sheets of disc substrates which are aligned to stand vertically on cooling mechanism 3, turns in a vertical upward direction, and rotates through substantially a right angle with respect to the turning direction in a midway through the turning to position the two sheets of disc substrates in a plane form, namely, in parallel to a plane of turn table 5, and, thereafter, turns again in a vertical downward direction to simultaneously mount the two sheets of disc substrates on two receiving stands 5a of turn table 5.

Three receiving stands 5a are disposed on turn table 5 through an equal angular interval of 120 degrees in a clockwise direction and are rotated intermittently through 120 degrees in the clockwise direction. Whenever turn table 5 is rotated through 240 degrees, second movably mounting means 4 receives two sheets of disc substrates from the two of three receiving stands 5a.

The disc substrates mounted on receiving portions 5a of turn table 5 are moved and mounted sequentially onto second turn table 7 by means of third movably mounting means 6. Turn table 7 includes, for example, eight receiving stands 7a at respectively equal angular intervals. Turn table 7 is rotated intermittently in a counterclockwise direction at a 45-degree interval which is approximately equal to an angle between adjacent receiving stands 7a.

The disc substrates (denoted by phantom lines of FIG. 1) mounted on receiving stands 7a are passed to a film forming device 8 such as a sputtering device at a predetermined position.

In the same manner as a normal film forming device 8, the disc substrates are supplied sequentially within film forming device 8 at a delivery position P1 by means of pull-in means not shown in the drawings. In film forming device 8, reflective films are formed on the supplied disc substrates.

This film forming device 8 has a function such that two kinds of reflective films whose reflectivities are different are formed alternately. Each of the disc substrates on which the reflective film is formed is again returned to one of receiving stands 7a which is stopped at delivery position P1.

Hence, on receiving stands 7a of second turn table 7, each of the disc substrates on which reflective films having different reflectivities are formed is alternately returned and mounted on receiving stands 7a of second turn table 7. The disc substrates on the receiving stands 7a of turn table 7 are moved and mounted onto a third turn table 10 at an adhering mechanism BD by means of third movably mounting means 9. It is noted that film forming device 8 can form the same reflective films for all disc substrates received, can form the reflective films which are formed alternately on the reflective films, and can set the formation on reflective films such that no reflective film is formed on any other of the disc substrates. It is noted that adhering mechanism BD includes devices from third turn table 10 to an inspection (check) device 27 after the curing device 23.

Third turn table 10 includes, for example, twelve receiving stands 10a and rotated intermittently at substantially 60-degree intervals in the clockwise direction. Each receiving portion 10a has a center part which is a space and cut out at a circumferential portion of turn table 10 and is opened outwardly.

The disc substrates mounted on the receiving portions 10a of turn table 10 is reversed at that position by means of a reversing mechanism 11 (which will be described later) for each sheet of disc substrates. At this time, liquid adhesive is supplied from an adhesive supply mechanism which is mounted on a corresponding reversing portion 10a of the subsequent adhesive supply portion.

Adhesive supply mechanism 12 forms a liquid adhesive in a doughnut shape by rotating its supply nozzle 12a onto each of the disc substrates mounted on receiving portions through 360 degrees.

When turn table 10 is rotated through one step, in other words, through substantially 60 degrees, the reversed disc substrates are adsorbed and held by means of an overlapping mechanism as will be described in details later and each of the reversed disc substrates is carried to the above-described each of the other disc substrates so that one of the reversed disc substrates is overlapped on one of the other disc substrates at an overlapping position P3 of the overlapping mechanism.

Next, turn table 10 is rotated through one step, in other words, through substantially 60 degrees and one of receiving stands 10a is reached to a delivery position P4. At this time, each of the overlapped disc substrates is alternately distributed on two separate spinners 15, 16 by means of a movably mounting mechanism 14 having three holding arms.

It is noted that one of the three holding arms which moves and mounts each of the disc substrates alternately on one of spinners 15, 16 is an arm located at a middle position as viewed from FIG. 1 and the arm holds the overlapped disc substrates and turns in the rightward and leftward directions through each of 90 degrees so as to distribute each of the held disc substrates to each of two spinners 15 and 16.

The other two arms as viewed from FIG. 1 of movably mounting mechanism 14 picks out each of the disc substrates alternately from spinners 15, 16 and mounts each of the picked out disc substrates onto a receiving stand 17 of a temporary delivery position P5.

It is noted that the reason that the three holding arms are provided is that the holding mechanism of the holding arm to move and mount each of the disc substrates onto spinners 15 and 16 from turn table 10 is different from the holding mechanism of the holding arms to pick out each of the disc substrates from spinners 15 and 16. If the holding mechanisms are integrated to the single holding mechanism, it may be sufficient for the holding mechanism to include one or two holding arms.

In FIG. 1, reference numeral 18 denotes a scrap chute. In a case where turn table 10 stops for a predetermined period of time due to a trouble, the liquid adhesive of each of the disc substrates on turn table is leaked out from a center hole of each of the disc substrates. This makes the subsequent process inconvenient. Hence, at an initial stage at which the trouble is repaired and the apparatus is started to be operated, for example, the arm of the movably mounting mechanism 14 serves to scrap the adhered disc substrates up to three sheets of disc substrates as a maximum from a delivery position P4 of turn table 10 to the scrap chute 18. In this embodiment, one of the disc substrates which is in the next fourth number sheet is supplied alternately to two spinners 15 and 16. At this time, two sheets of adhered disc substrates mounted on receiving stands 17 of the temporary mount position PS are moved and mounted onto a turn table 20 by means of movably mounting mechanism 19.

Then, two sheets of adhered disc substrates mounted on receiving stand 17 of a temporarily mounted position P5 is moved and mounted on turn table 20 by means of movably mounting mechanism 19.

Movably mounting mechanism 19 is provided with two holding arms, one arm movably mounting the disc substrates on receiving stand 17 onto a turn table 20 and the other arm movably mounting the disc substrates on which the adhesive is cured from turn table 20 to the subsequent turn table 21.

A weight (not shown) such as an aluminum plate or heat-resistant glass (on a center of which a penetrated hole is provided) is mounted on the disc substrates mounted on turn table 20 at the subsequent position. This weight serves to assist an adjustment of a warp quantity of the disc substrates and three weights are prepared.

Weight carrying mechanism 22 holds the weight mounted on a center mount position P6 of turn table 20 and carries it to amounting position P7 and the weight is, then, mounted on the disc substrates.

On the other hand, at a removing position P8, weight carrying mechanism 22 removes the weight from each of the heat-treated disc substrates and the disc substrate is carried to the mounting position P6 and, at the mounting position P6, the carried weight is mounted on position P6. Hence, it is sufficient to have these weights. The weight is cooled at mounting position P6.

The ultra-violet rays from curing device 23 are radiated at a curing position P9 and the liquid adhesive between the disc substrates is cured.

An ultra-violet ray radiating section includes: a Xenon lamp which emits ultraviolet rays in a pulse form or an ultra-violet ray generating lamp which emits a continuous light to an upper side or lower side of turn table 20 or both. In this embodiment, an ultraviolet ray radiator is installed on both sides thereof as will be described in details later. A radiating quantity of ultra-violet ray radiator is installed or both sides thereof as will be described in details later. A radiating quantity of ultra-violet rays from the upper side or lower side of turn table 20 is adjusted. Hence, a warp of each of the disc substrates is made small by adjusting a radiation quantity of the ultra-violet rays from either the upper or lower or both of turn tables 20.

The optical disc returned to the initial position is carried to a cooling turn table 21 by means of movably mounting mechanism 19 as described before. Turn table 21 includes: four receiving stands cut at its circumferential portion in the same way as turn table 10. Four receiving portions thereof are disposed at each substantially 90-degree interval. Turn table 21 rotates in the counterclockwise direction intermittently through each of substantially 90-degree intervals. At a second position through which turn table 21 is rotated through one step, in other words, through 90 degrees from a position at which the optical disc is received, the optical disc is reversed by means of front-surface-and-rear-surface reversing means 24 which is the same as reversing means 11. This reverse operation is selectively carried out from a relationship thereof to an inspection process which is carried out at the subsequent process. If there is no need in terms of the inspection, the reversing means is not operated and the reverse operation is not carried out.

At the next third position, a de-electrified blower 25 blows ionized air into each of the disc substrates located at the third position to remove dust adhered onto the surface of the optical disc.

At a fourth position, one holding arm of movably mounting means 26 having two arms carries each of the disc substrates onto an inspection device 27. At a process carried by turn table 21, a temperature of the optical disc which is temperature raised due to the heat of curing device 23 is reduced substantially up to the normal temperature.

Inspection apparatus 27 carries out an inspection set from a lower side thereof. When the inspection is ended, the optical disc of the inspection apparatus 27 by the other holding arm is mounted on an elevation stage 28.

When elevation state 28 receives the optical disc, the holding arm of movably mounting means 29 is raised up to a position at which the holding arm waits and is brought in contact with its adhering surface thereof. Accordingly, movably mounting means 29 is activated so that the optical disc is adsorbed and held onto the holding arm. In addition, movably mounting means 29 turns in a horizontal direction. If a result of inspection indicates good product (success), the corresponding optical disc is sequentially mounted on a stacker 31 of a good product table 30 and is piled up thereon.

Then, when elevation stage 28 passes the optical disc to movably mounting means 29, elevation stage 28 is lowered and is returned to an original position. Hence, the holding arm of movably mounting means 29 turns only a turning operation in a horizontal direction.

In this respect, holding arms of the other movably mounting devices 6, 9, 14, 19, and 26 carry out the rising operation, lowering operation, and horizontal turn operation.

It is noted that a plurality of stackers 31 are removably mounted on good product table 30 at constant intervals. When a predetermined number of the optical discs are mounted, table 30 is rotated and the optical discs are mounted on the subsequent stacker 31 on good product table 30. The non-good product is mounted on a non-good product table 32 or 34. The manufacturing process is then ended.

Next, a case where the trouble occurs on one of the mechanisms subsequent to and including turn table 10 will be described with reference to FIGS. 2(A) and 2(B).

FIG. 2(A) shows an operation state in which no abnormality occurs.

FIG. 2(B) shows an operation state in which some abnormality occurs. Since the operation in which no abnormality is absent will already been described and its detailed explanation will herein be omitted.

If the abnormality occurs at a process subsequent to the film forming process, each of the mechanisms after turn table 10 stops automatically or manually. However, to maintain a molding quality, an operation of each of the mechanisms from molding machine 1 to movably mounting means 9 is continued. At this time, movably mounting means 9 carries out a different operation from that during the normal operation. At a position P2 of turn table 7, disc substrates are adsorbed and held so as to scrap into discharge chute 36. This discharge chute 36 is divided into two according to a kind of metallic materials of the reflective films which are formed on the disc substrates is used according to the types of the disc substrates on which the reflective films are formed or on which the reflective films are not formed. This can be achieved only by alternately distributing the disc substrates into two chutes of the holding arm of movably mounting means 9 in a sequence.

Next, a specific example in which each of the disc substrates molded from molding machine 1 is moved and mounted onto cooling mechanism 3 will be described with reference to FIGS. 3(A) and 3(B).

Movably mounting means 2 includes: a driving portion 2a, a holding arm 2b which is driven by driving portion 2a; and two absorbing-and-holding portions 2c and 2d mounted on a tip end portion of movably mounting arm 2b.

First, two sheets of disc substrates are picked out simultaneously by mans of disc substrate picking out means. As shown in FIG. 3(A), at the same time when two sheets of disc substrates a and b are simultaneously received from the disc substrate picking means and adsorbed and held, movably mounting means 2 turns in a vertical lower direction shown by an arrow.

Figure 3:
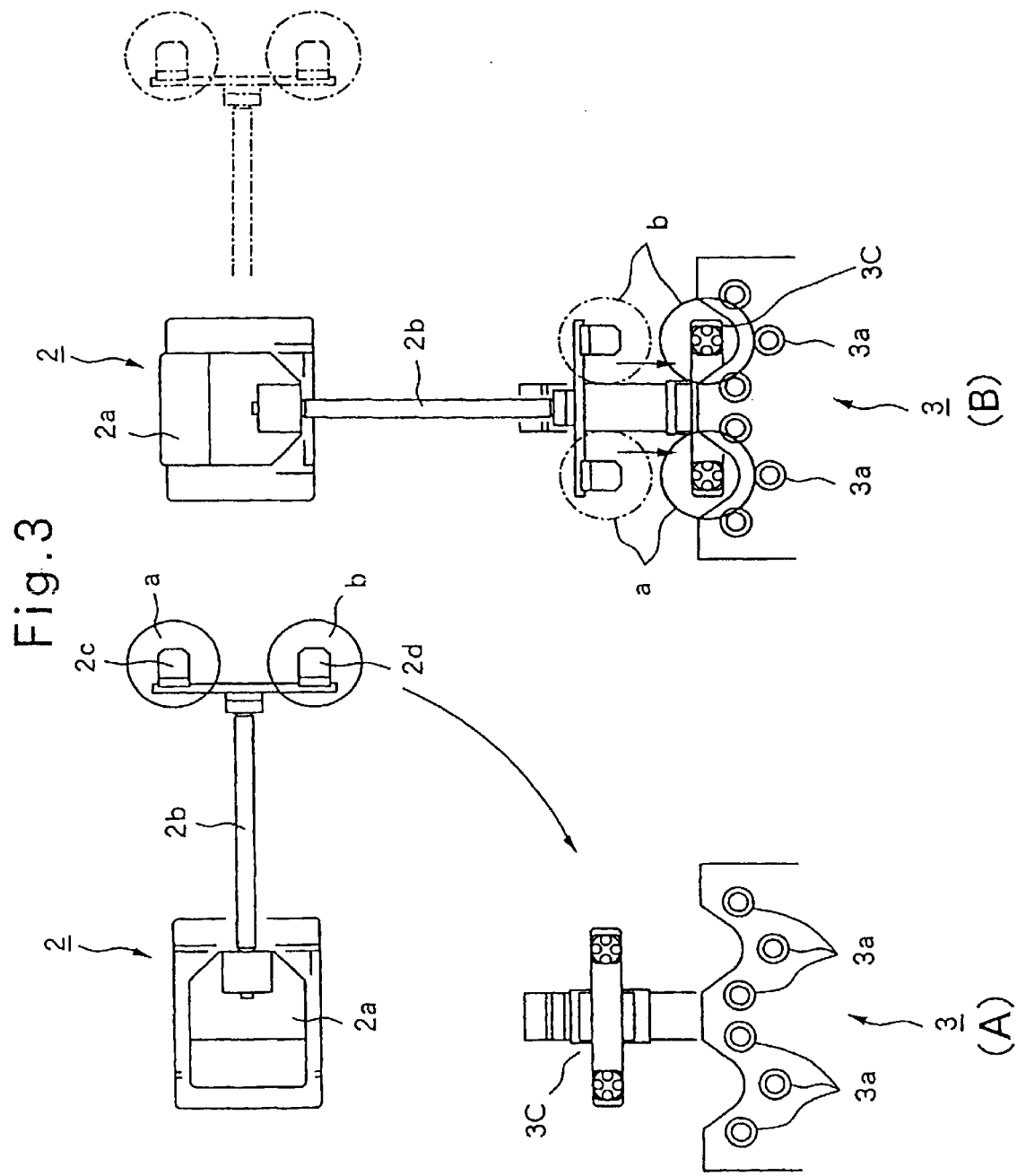
FIGS. 3(A) and 3(B) are explanatory views for explaining a mechanism for movably mounting each of the disc substrates from a molding machine of the optical disc manufacturing apparatus to a cooling mechanism thereof.
Figure 4:
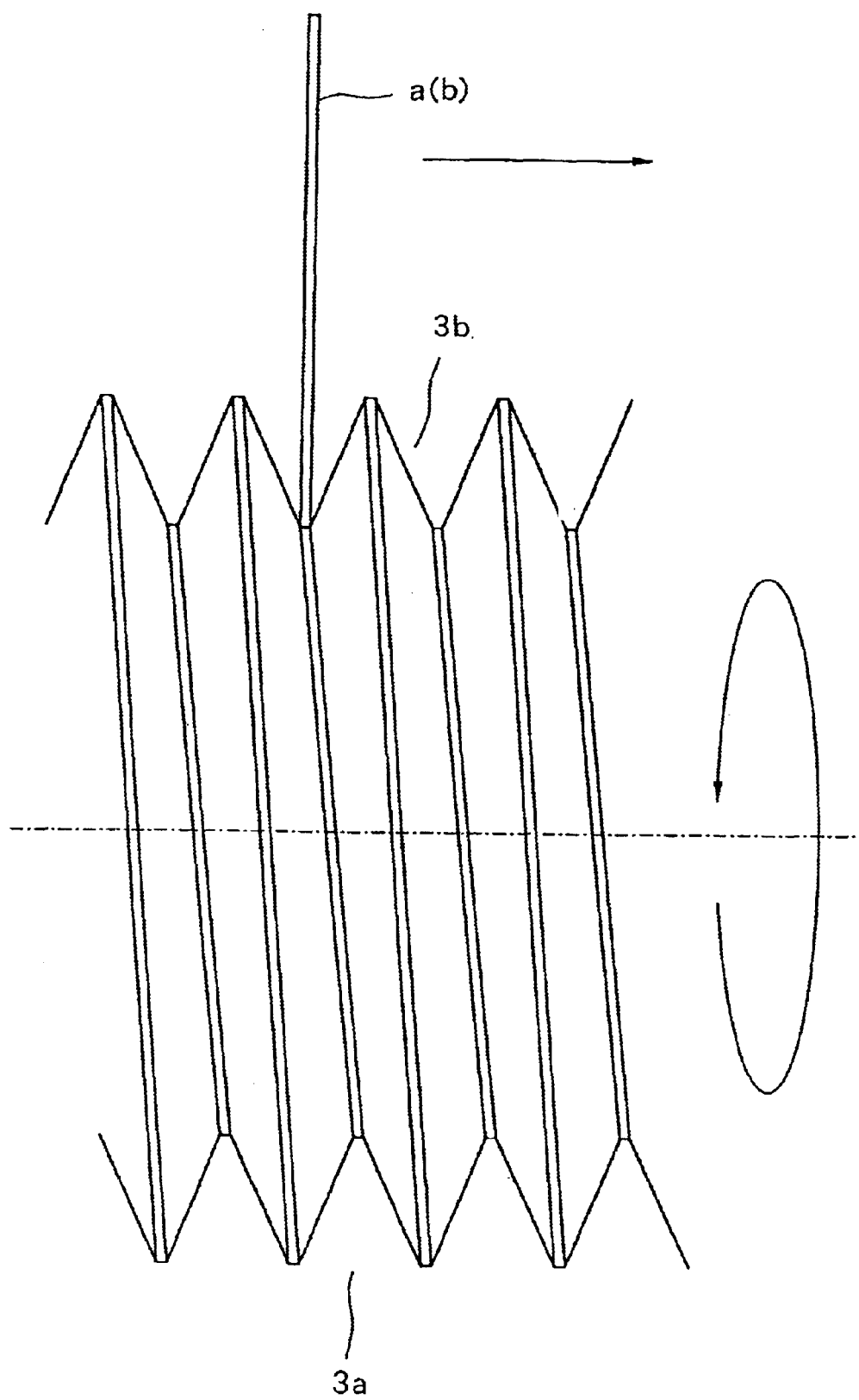
FIG. 4 is a partial view of an example of a cooling mechanism from a molding machine of the optical disc manufacturing apparatus according to the present invention.

Then, as shown in FIG. 3(B), when two sheets of disc substrates a and b reach on the mounting position of cooling mechanism 3, the cooling mechanism 3 receives and lowers the two sheets of the disc substrates with arm 3c, and places the two disc substrates simultaneously in the cooling mechanism 3. Cooling mechanism 3 includes two cooling portions having three couples of forward feed shafts 3a. All of forward feed shafts a have the same structures. A spiral feed groove 3b formed at a constant pitch is formed on a straight shaft as shown in FIG. 4. This feed groove has depth and width such that a circumferential end portion of disc substrate a(b) is tightly inserted thereinto and is not easily deviated therefrom. This feed groove 3b of three forward feed shafts 3a which is disposed preferably on a summit of an isosceles triangle is arranged to receive each of the circumferential portions of disc substrates a(b) equally. These six feed shafts 3a are rotated in an arrow marked direction in FIG. 4 at a constant speed by means of a driving portion not shown.

Hence, disc substrates a and b mounted vertically on respective couples of three advance shafts 3a are forward fed at a constant distance until the subsequent disc substrates are moved and mounted by means of movably mounting means 2. In this way, disc substrates a and b of a predetermined number of sheets in a double file are sequentially forward fed. When they reach to a predetermined position, movably mounting means 4 moves and mounts disc substrates a, b shown in FIG. 3(B) simultaneously to turn table 5.

Movably mounting means 4 includes driving portion 4a, a turning arm 4b operated by means of driving portion 4a, and rotating arms 4c and 4d extended vertically with a space provided from turning arm 4b. Each rotating arm 4c and 4d is provided with an adsorbing pad (not shown) which adsorbs (absorbs and holds) an inner part of each disc substrate on which the information is not recorded.

Figure 5:
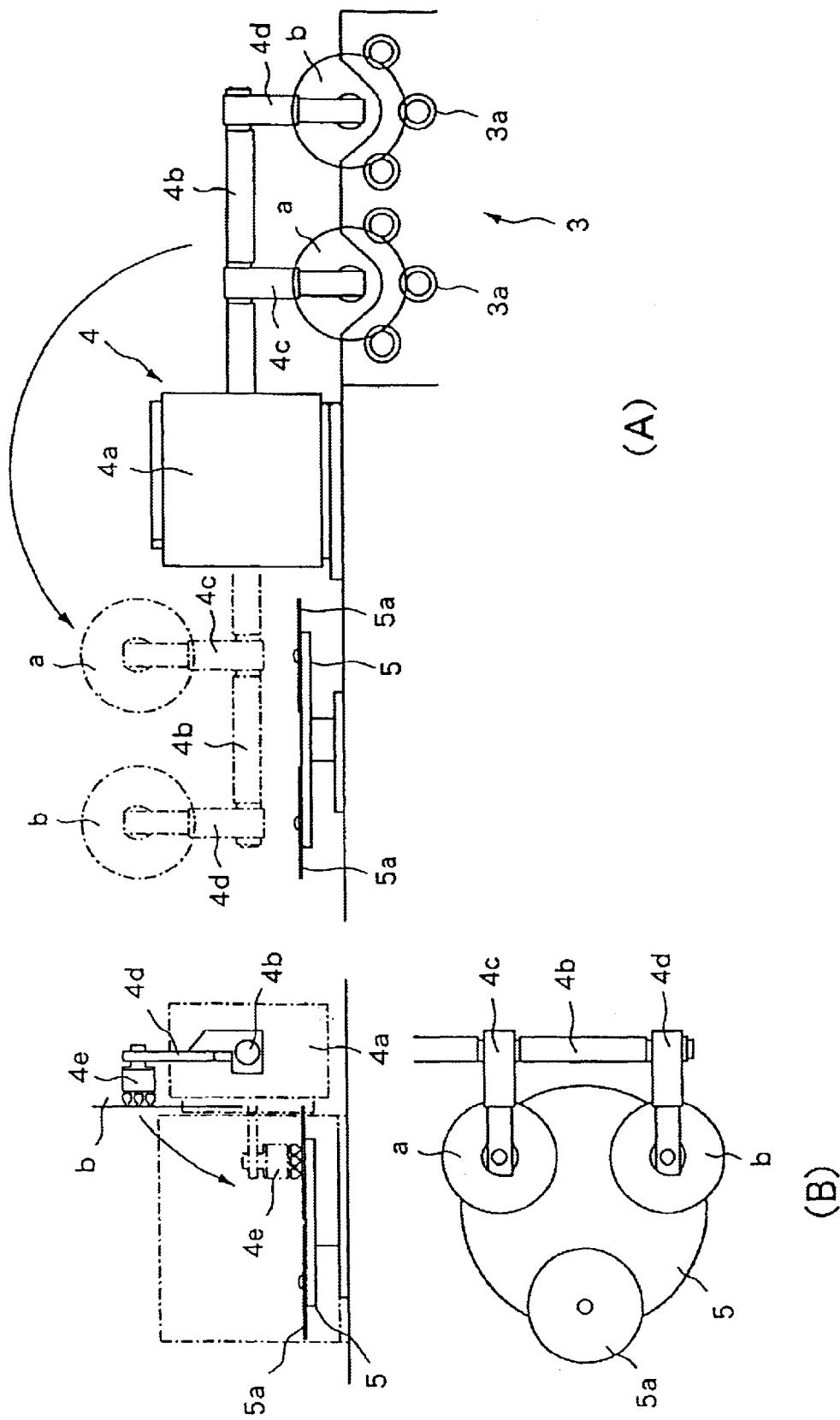
FIGS. 5(A) and 5(B) are partial views of an example of a movably mounting mechanism which movably mounts each of the disc substrates from the cooling mechanism of the optical disc manufacturing apparatus.
Figure 6:
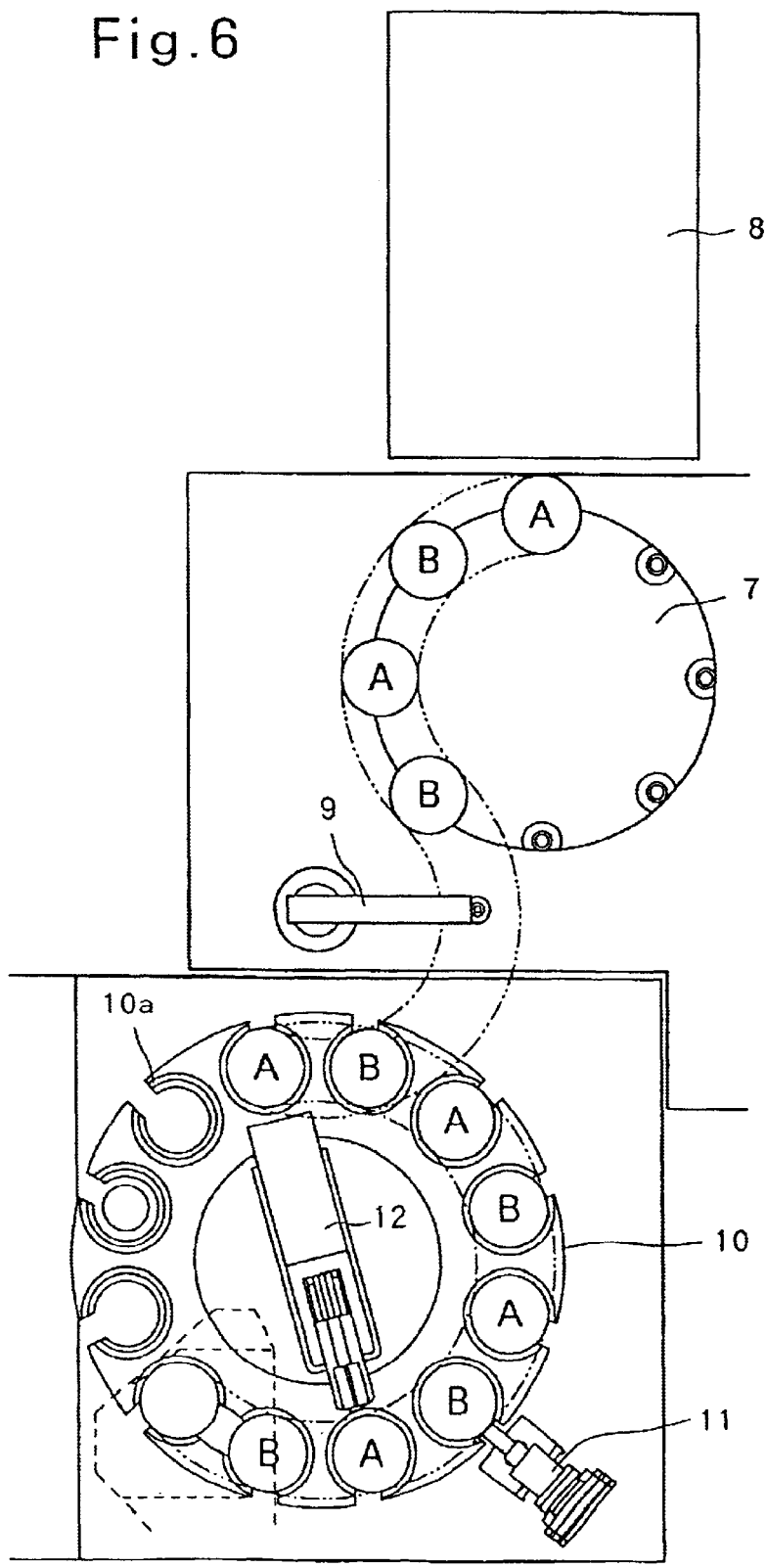
FIG. 6 is an explanatory view for explaining an overlapping step and its previous step of each of the disc substrates in the optical disc manufacturing apparatus according to the present invention.

As shown in FIG. 5(A), when absorbing-and-holding (adsorbing) portion 4e of rotating arms 4a and 4d absorbs and holds (adsorbs) disc substrates a and b, the turning arm 4b carries out a turning motion as in an arrow mark of (A) of FIG. 5 and becomes a state denoted by a dot-and-dash line of FIG. 5(A). Thereafter, rotating arms 4a and 4d are rotated through substantially a right angle with respect to a turning plane as denoted by an arrow mark in FIG. 5 (A). Then, disc substrates a, b as shown in FIG. 5(B) are simultaneously mounted on two receiving stands 5a of turn table 5. The next operation is carried out when turn table 5 is rotated through two steps, namely, is rotated through substantially 240 degrees and two vacant receiving stands 5a are stopped at a mutually equal position with respect to a turning surface of turning arm 4b.

Next, a specific example of such a process that after the film forming process by means of film forming device 8, the reverse of the disc substrates with the adhering process on adhering mechanism BD, and two sheets of disc substrates are overlapped together with the supply of liquid adhesive will be described with reference to FIGS. 6 through 10.

Two kinds of disc substrates A and B are alternately outputted from film forming device 8 and are mounted on receiving stands of a turn table 7. The reflective films whose reflectivities are different are respectively formed on disc substrates A and B. Or if no information is recorded on disc substrate A, the reflective film is formed only on disc substrate B. The reflective film is formed only on disc substrate B. The reflective film is not formed on disc substrate A or a reflective film having the substantially same as disc substrates A and B is formed on disc substrate A or B.

Disc substrate A or B is sequentially mounted on a receiving portion 10a of turn table 10 by means of movably mounting means 9. This turn table 10 has twelve receiving portions 10a. Hence, turn table 10 is revolved intermittently through substantially 30 degrees. As shown by dash lines of FIG. (a) through (h) of FIG. 7, with a position pair of disc substrates A and B as one step, a series of processes are conducted. Hence, movably mounting means 9 sequentially mounts disc substrates A and B on adjacent pair of receiving portions 10a while turn table 10 stops. Then, only disc substrate B is reversed by means of reversing means 11 at a reversing position. Then, since only disc substrate B is reversed by means of reversing means 11 at a reversing portion and the other disc substrate A is not reversed, this disc substrate is carried to the next position.

Figure 9:
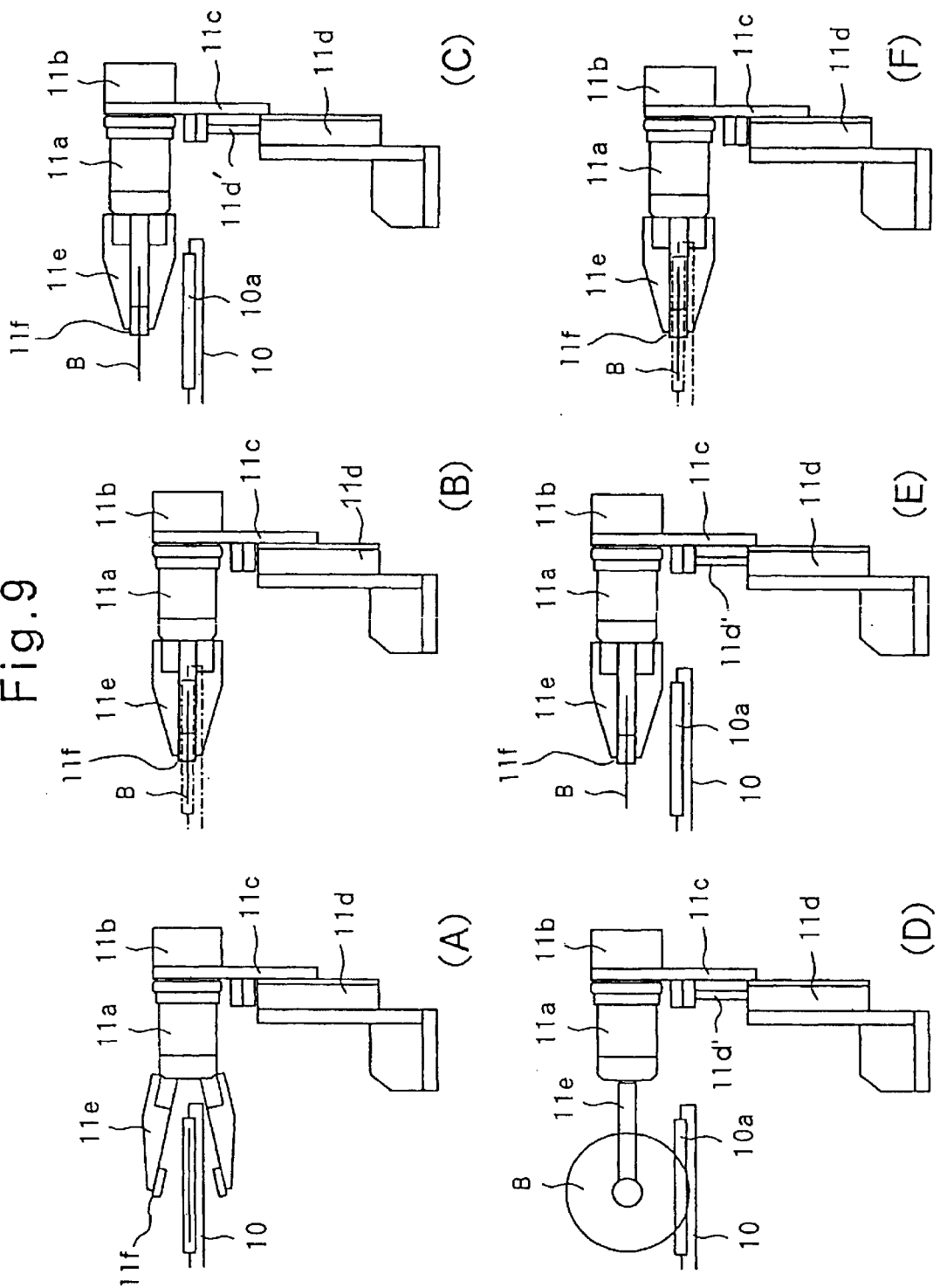

As shown in FIG. 8, reversing means 11 includes: a grasp arm 11a extended through a cut-out portion 10b of a receiving portion 10a of turn table 10; a driving portion 11b which drivingly rotates the grasp arm 11a through 180 degrees; a vertical arm 11c which supports the grasp arm 11a and driving portion 11b shown in FIGS. (A) through (F) of FIG. 9: and straight line driving section 11d which elevates vertical arm 11c; and so on.

An operation of reversing means 11 will be described with reference to (A) through (F) of FIG. 9.

As shown in (A) of FIG. 9, grasping portions 11e of grasp arm 11a are of a type wherein tip end portions are angulary opened with grasp arm 11a as a fulcrum. A circular grasp plate 11f to grasp a non-recording portion of each disc substrate surrounding a center bole of each of the disc substrates is attached onto each of their respective tip positions of grasping portions 11e. Grasping portions 11e waits with opened state. As shown by (B) of FIG. 9, when disc substrate B arrives at a reversing position, driving portion 11b is operated to close grasping portion 11e so that circular grasping plate 11f grasps both surfaces of non-recording portions placed on a vicinity to the center hole of disc substrate B. Thereafter, as shown by (C) of FIG. 9, a rod 11d' of straight line driving portion 11d is raised and vertical arm 11c is also raised. Together with a rise in grasping arm 11a formed above rod 11d', vertical arm 11c and grasping portion 11e are raised up to a position at which no problem occurs in the reverse rotation of disc substrate B.

Next, grasping portions 11e are rotated together through 180 degrees. FIG. (D) of 9 shows a state of 90-degree rotation in a midway through the rotation of 180 degrees. FIG. (E) of 9 shows a state wherein grasping portions 11e, i.e., disc substrate B is rotated through 180 degrees.

Thereafter, rod 11d' of straight line driving portion 11d is retracted. As shown by (F) of FIG. 9, grasping arm 11a and grasping portion 11e are lowered to an original position. Then, as shown in (A) of FIG. 9, grasping portion 11e returns to the original position. As shown in (A) of FIG. 9, grasping portions 11e are opened to return disc substrate B whose surfaces are reversed to receiving portion 10a of turn table 10. In this way, disc substrate B is reversed.

Figure 7:
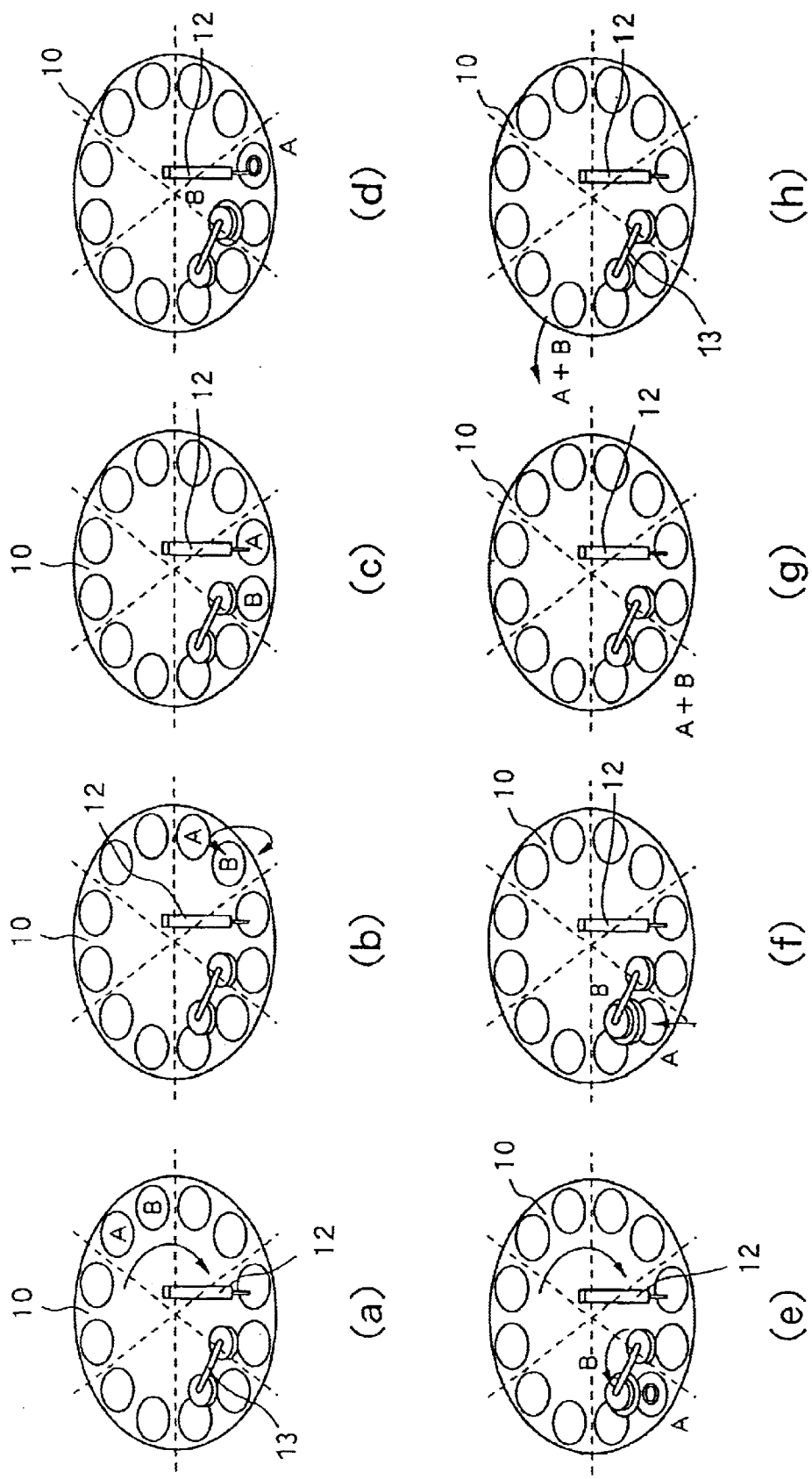

Referring back to (a) through (h) of FIG. 7, adhesive supply mechanism 12 is operated at the next position at the same time. The nozzle of adhesive supply mechanism 12 ejects the liquid adhesive and is rotated over the surface of disc substrate A through 360 degrees so that a thick film of liquid adhesive in a doughnut shape is formed on disc substrate A. While the reversing of disc substrate B and the liquid film formation on disc substrate A are carried out, another disc substrate B at immediate next position is overlapped on disc substrate A. In details, the thick liquid adhesive film in doughnut shape has been formed on each of disc substrates A carried to overlapping mechanism. In addition, all disc substrates B are reversed. This overlapping operation will be explained with reference to FIG. 10.

The overlapping mechanism 13 includes: a shaft 13a which rotates through 180 degrees in a horizontal direction; an adsorbing plate 13b attached onto a tip of shaft 13a; a pair of adsorbing plate 13c and 13d of an adsorbing plate 13b; and elevating devices 13e and 13f positioned at a lower side of turn table 10 for elevating through receiving portion 10a. Pair of adsorbing plates 13c and 13d of adsorbing plate 13b are located above the pair of receiving portions 10a to which turn table 10 is adjoined. Receiving surfaces 13e' and 13f' of elevating device 13e and 13f are smaller than inner diameter of receiving portion 10a of turn table 10.

When turn table 10 is rotated intermittently and stops, receiving surface 13e' of elevating device 13e is started to be raised. During the raising process, receiving surface 13e' receives disc substrate B from turn table 10 and further raised so that disc substrate B is brought in contact with adsorbing portion 13c. At this time, adsorbing portion 13c starts the adsorbing motion so that disc substrate B is adsorbed onto adsorbing portion 13c.

Next, when shaft 13a rotates through 180 degrees, adsorbing portion 13c is moved to the position of adsorbing portion 13d, the adsorbing portion 13d is moved and stopped to the position of adsorbing portion 13c. At this time, elevating device 13f is operated to raise its receiving portion 13f'. During the raising process, receiving portion receives disc substrate A from turn table 10 and further raised so that disc substrate A is brought in contact with disc substrate B and the overlapping is carried out. In this state, adsorbing portion 13c stops the adsorbing operation and the disc substrate B is opened. Accordingly, the overlapped disc substrates A and B are received by receiving surface 13f' of elevating device 13f.

Next, receiving surface 13f' of elevating device 13f is started to be lowered and disc substrates A and B are delivered onto turn table 10. Receiving surface 13f' is furthermore lowered and returned to its original position. Then, as described above, overlapped disc substrates A and B are alternately delivered to spinners 15 and 16.

It is preferable to control a rising speed of the elevating device 13f as follows. Disc substrate A is caused to approach to disc substrate B at a high speed until a time immediately before disc substrate A is brought in contact with disc substrate B. Then, at the time immediately before the contact, a speed of disc substrate A is remarkably decelerated so that adhesive on disc substrate A is contacted against disc substrate B and is furthermore decelerated if necessary so that the adhesive is widened and enlarged.

It is furthermore preferable to apply an alternating-current voltage or direct-current voltage between disc substrate A and disc substrate B. The application of alternating-current voltage or direct current voltage can prevent a void between disc substrate A and disc substrate B, in other words, air bubbles from being formed.

Next, a preferred embodiment of curing device 23 will be described with reference to FIG. 11.

FIG. 11(A) shows a top view of turn table 20 and curing device 23 and FIG. 11(B) shows an elevational view thereof.

In these figures, movably mounting means 19 and weight carrying means 22 shown in FIG. 1 are omitted herein. As shown in FIG. 11(8), curing device 23 includes: a heat shield plate 23a which is substantially vertical to turn table 20 and is extended downward; ultra-violet my radiators 23b denoted by a dot line and 23c denoted by a dot-and-dash line; and a skirt 23d to limit the ultra-violet rays from being leaked out externally.

A heat shield plate 23a is placed at a position in a proximity to a line connecting between an outer wall X of adhering section shown in FIG. 1 and an outer wall Y of exhaust section.

Hence, ultra-violet ray radiators 23b and 23c from which the heat is developed are placed at an outer portion from a line connecting an outer wall X of the adhering section and an outer wall Y of discharge section.

This arrangement and heat shield plate 23a have less thermal influence onto another part and the skirt 23d increases this advantage.

In this embodiment, ultra-violet ray radiators 23b and 23c radiate ultra-violet rays through both sides of mutually adhered two disc substrates. Since a direction of a warp of the adhered two sheets of disc substrates is uniform, the quantity of ultraviolet ray radiators 23b and 23c are adjusted and the warp can be reduced. The warp quantity is detected for each of the overlapped disc substrates and converted into an electrical signal so that the quantity of ultra-violet rays outputted from ultra-violet radiators 23b and 23c is controlled. At this time, a substantially flat optical disc regardless of a magnitude of warp can be achieved.

It is noted that, in the above embodiment, molding machine 1 simultaneously molds two sheets of disc substrates and film forming device 8 can form two kinds of reflective films whose reflectivities are different.

However, molding machine may only mold one sheet of disc substrate and film forming device 8 may form one kind of reflective film. In this case, two molding machines are needed. These two molding machines may be arranged in respective right angle directions to molding machine 1 shown in FIG. 1 in parallel to each other and a cooling mechanism 3 may be interposed between the two molding machines.

Then, disc substrate is moved and mounted onto the cooling mechanism from molding machine located at both sides by means of their corresponding molding machines. Disc substrates may forward fed toward a direction of turn table 5 according to the structure of the above-described cooling mechanism. When the forward fed two sheets of disc substrates have arrived at a predetermined position, disc substrates may simultaneously be adsorbed and held thereat and may be moved and mounted on turn table.

In addition, the number of receiving stands 5a of turn table 5 may not be three and may be four or more.

In a case where film forming device 8 has a function of only forming one kind of reflective film, another same film forming device may be provided and the disc substrates after the respective films have been formed by respective film forming devices may alternately be outputted onto receiving stands 7a of turn table 7. For the later mechanism, the structure shown in FIG. 1 may directly be used. This gives a large practical effect.

Furthermore, the supply of the liquid adhesive is not always supplied on the upper surface of the disc substrates but may be supplied onto a lower surface of the reversed disc substrates. In this case, adhesive supply nozzle 12 is raised through the received stands of the turn table and is adhered onto the lower surface of the disc substrates with the liquid adhesive stopped at a position immediately before the disc substrates are brought in contact with the disc substrates.

In this case, at the same time when a time duration for which the liquid adhesive is supplied in the doughnut shape, the liquid adhesive in a preferable form may be formed so that a high quality adhering can be achieved.

According to the present invention as described above, an optical disc apparatus which is compact and can be produced at a fast production speed can be provided and a high quality optical disc can be manufactured.

What is claimed is:

1. An optical disc manufacturing apparatus for manufacturing an optical disc by bonding two disc substrates, the optical disc manufacturing apparatus comprising:

a turn table having a plurality of receiving portions on which the disc substrates are to be mounted, the turn table being arranged to rotate intermittently through a constant angle in each time, and to receive first and second disc substrates in a pair, respectively on adjacent two of the receiving portions, at least one of the first and second disc substrates being formed with a reflective film, the turn table being formed with a plurality of cutout portions each extending radially from an outer periphery of the turn table to one of the receiving portions;

reversing means for reversing the second disc substrate by utilizing the cutout portion extending into the receiving portion on which the second disc substrate is seated, and by holding a non-recording portion around a center hole of the second disc substrate, and for returning the second disc substrate, and for returning the second disc substrate in a reversed state to the receiving portion on the turn table;

an adhesive supplying nozzle which supplies a liquid adhesive onto the first disc substrate on the turn table;

an overlapping mechanism which overlaps the first and second disc substrates on the turn table;

a spinner which spins the overlapped disc substrates; and a curing device which cures the liquid adhesive.

2. An optical disc manufacturing apparatus as claimed in claim 1, wherein the overlapping mechanism is arranged to move the second disc substrate in the reversed state and turning in a horizontal direction, to a position just above the first disc substrate to which the liquid adhesive is supplied and to overlap the first and second disc substrates on each other.

3. An optical disc manufacturing apparatus as claimed in claim 1, wherein the optical disc manufacturing apparatus comprises carrying means including a turn table for receiving the first and second disc substrates from the spinner, and the curing device is arranged to cover a part of the turn table and to radiate ultra-violet rays onto the first and second disc substrates in the overlapped state when the first and second disc substrates on the turn table pass through the curing device.

4. An optical disc manufacturing apparatus as claimed in claim 1, wherein the overlapping mechanism comprises: first elevating means for rising from a lower position below the turn table, for receiving the second disc substrate in the reversed state from the turn table and for raising the second disc substrate in the reversed state in upwards direction; moving means for holding the second disc substrate in the reversed state, for turning in the horizontal direction and for moving the second disc substrate to a position just above the first disc substrate to which the liquid adhesive is supplied; and second elevating means for rising from a lower position below the turn table, for raising the first disc substrate to which the liquid adhesive is supplied, for overlapping the first disc substrate onto the second disc substrate held in the reversed state by the moving means, for supporting the first and second disc substrates in an overlapped state and for lowering to return the first and second disc substrates in the overlapped state to the turn table.

5. An optical disc manufacturing method for manufacturing an optical disc by two disc substrates, the optical disc manufacturing method comprising;

a film forming step of sequentially receiving substrate pairs each including a first disc substrate and a second disc substrate, and forming a reflective film on at least one of the first and second disc substrates;

a rotating step of placing the first and second disc substrates of each substrate pair, respectively, on two adjacent receiving portions of a rotary carrying means, and rotating intermittently the first and second disc substrates on the adjacent receiving portions about a vertical axis of the rotary carrying means;

a reversing step of reversing the second disc substrate of each substrate pair on the adjacent receiving positions of the rotary carrying means while leaving the first disc substrate unreversed;

an adhesive supplying step of supplying a liquid adhesive onto one of an upper surface of the first disc substrate remaining unreversed, and a lower surface of the second disc substrate in a reversed state of each substrate pair on the adjacent receiving portions of the rotary carrying means;

an overlapping step of moving one of the first and second disc substrates of each pair to put the first and second disc substrates in a confronting state in which the second disc substrate in the reversed state is positioned just above the first disc substrate remaining in a non-reversed state, and then bringing the first and second disc substrates to an overlapped state;

a step of spinning the first and second disc substrates of each pair in the overlapped state; and a step of curing the liquid adhesive between the first and second disc substrates of each substrate pair.

6. An optical disc manufacturing method as claimed in claim 5, wherein the overlapping step comprises an operation of applying an alternating current voltage or a direct-current voltage between the first and second disc substrates in the confronting state before the liquid adhesive substrate comes into a contact state in which the liquid adhesive is in contact with both of the disc substrates.

7. An optical disc manufacturing apparatus for manufacturing an optical disc constituted by two sheets of mutually adhered disc substrates, the optical disc manufacturing apparatus comprising:

carrying means, having a plurality of receiving portions on which the disc substrates are to be mounted, for rotating intermittently through each constant angle, the receiving portions comprising: a turn table which is cut out in a vicinity to an outer peripheral portion of the carrying means and which is arranged in such a manner that the receiving portions receive alternately one of the disc substrates on each surface of which a reflective film is formed or any other of the disc substrates on either surface of which the reflective film is formed with both of the disc substrates as a pair;

reversing means for reversing one of the pair of disc substrates utilizing the cut out portion of the turn table;

an adhesive supplying nozzle which supplies a liquid adhesive onto one of the pair of disc substrates;

an overlapping mechanism which overlaps the pair of the disc substrates;

a spinner which spins the overlapped disc substrates; and a curing device which cures the liquid adhesive, wherein the overlapping mechanism comprises: first elevating means for rising from a lower portion of the turn table, for receiving the reversed disc substrates from the turn table, and for raising the reversed disc substrates in a vertical upward direction; moving means for absorbing and holding the reversed disc substrates and turning in the horizontal direction and for moving the reversed disc substrates just above one of the disc substrates to which the liquid adhesive is supplied and which is mounted on an adjacent receiving portion; and second elevating means for rising from a lower direction of the turn table, for raising one of the disc substrates to which the liquid adhesive is supplied, for overlapping the raised disc substrate onto the disc substrate held by the moving means, for supporting the overlapped two sheets of the disc substrates and lowering to return the supported overlapped two sheets of the disc substrates to the turn table.

8. An optical disc manufacturing apparatus as claimed in claim 7, wherein the optical disc manufacturing apparatus comprises carrying means including a turn table for receiving the disc substrates from the spinner, and the curing device is arranged to cover a part of the turn table and to radiate ultra-violet rays onto the disc substrates when the disc substrates on the turn table pass through the curing device.

9. An optical disc manufacturing apparatus for manufacturing an optical disc by bonding two disc substrates, the optical disc manufacturing apparatus comprising:

a molding machine to mold each of the disc substrates;

a cooling mechanism to cool the disc substrates;

first movably mounting means for moving the disc substrates from the molding machine to the cooling mechanism and mounting the disc substrates onto the cooling mechanism;

first carrying means having receiving portions;

second movably mounting means for moving the disc substrates from the cooling mechanism to the receiving portions of the first carrying means;

a film forming device to receive sequentially the disc substrates from the first carrying means, and to form a reflective film on a surface of at least one of the disc substrates;

second carrying means having a plurality of receiving portions each receiving one of the disc substrates, the second carrying means being arranged to rotate intermittently through a constant angle in each rotating interval;

reversing means for reversing one of the disc substrates into a reversed state on a first receiving portion which is one of the receiving portions of the second carrying means, and for leaving another of the disc substrates in a non-reversed state on a second receiving portion which is another one of the receiving portions of the second carrying means;

an adhesive supplying mechanism to supply a liquid adhesive onto the disc substrate remaining in the non-reversed state on the second receiving portion of the second carrying means;

an overlapping mechanism to move the disc substrate in the reversed state from the first receiving portion to a position just above the disc substrate supplied with the liquid adhesive and rested on the second receiving portion, and to overlap the disc substrate in the reversed state on the disc substrate supplied with the liquid adhesive, to put the disc substrates in an overlapped state;

a spinner to spin the disc substrates in the overlapped state; and a curing device to radiate ultra-violet rays on the disc substrates in the overlapped state to cure the adhesive after a spinning operation by the spinner.

10. An optical disc manufacturing apparatus as claimed in claim 9, wherein the molding machine is capable of molding disc substrates one by one or molding simultaneously two disc substrates at a time.

11. An optical disc manufacturing apparatus as claimed in claim 10, wherein the first movably mounting means is capable of movably mounting substrates one by one or simultaneously two disc substrates at a time.

12. An optical disc manufacturing as claimed in claim 9, wherein the cooling mechanism is arranged to receive substrates one by one, or simultaneously two disc substrates at a time and to cool disc substrates arranged with spatial intervals in a standing state in which disc substrates are positioned upright in single file or in a double file.

13. An optical disc manufacturing apparatus, as claimed in claim 9, wherein the cooling mechanism includes three or more feed shafts, each feed shaft having a helical groove formed spirally at the same pitch and the feed shafts being arranged to support each disc substrate upright, by holding, an outer periphery of the disc substrate in the grooves, and to advance each disc substrate by rotating at the same speed.

14. An optical disc manufacturing apparatus as claimed in claim 9, wherein the optical disc manufacturing apparatus further comprises:

a discharge chute and third movably mounting means interposed between the film forming device and the overlapping mechanism, for discharging disc substrates outputted from the film forming device, to the discharge chute while a downstream section including the overlapping mechanism, the spinner and the curing device is stopped, and an upstream section including the molding machine, the cooling mechanism and the film forming device is continued to be operated when a trouble occurs in the downstream section.

15. An optical disc manufacturing apparatus as claimed in claim 14, wherein the discharge chute is divided into two parts to which the third movably mounting means distributes alternately the disc substrates outputted from the film forming device according to a difference in reflective films formed on the disc substrates or according to presence or absence of a reflective film on each of the disc substrates.

16. An optical disc manufacturing apparatus as claimed in claim 9, wherein the first movably mounting means includes a transfer mechanism to transfer disc substrates one by one or simultaneously two disc substrates at a time.

17. An optical disc manufacturing apparatus claimed in claim 9, wherein the second movably mounting means includes a transfer mechanism to turn in a vertical direction from the cooling mechanism by sucking at least one of the disc substrates, then to rotate through substantially a right angle, and to place the disc substrates in a horizontal state on the receiving portions of the first carrying means.

18. An optical disc manufacturing apparatus as claimed in claim 9, wherein the manufacturing apparatus further comprises a discharge chute and third movably mounting means interposed between the film forming device and a downstream section including the second carrying means, the reversing means, the adhesive supplying mechanism, the overlapping mechanism, the spinner and the curing device, the third movably mounting means discharging disc substrates outputted from the film forming device, to the discharge chute while the downstream section is stopped, and an upstream section including the molding machine, the cooling mechanism and the film forming device is continued to be operated when trouble occurs in the downstream section.

19. An optical disc manufacturing apparatus claimed in claim 9, wherein the overlapping mechanism is arranged to apply an alternating-current voltage or a direct-current voltage between the disc substrate in the reversed state and the disc substrate is supplied with the liquid adhesive before the liquid adhesive comes into contact with the disc substrate in the reversed state.

* * * * *